Sept. 11, 1956  J. KARITZKY  2,762,252
ONE-PIECE COLLAPSIBLE SHEET METAL BOLT ANCHOR
Filed April 27, 1955  2 Sheets-Sheet 2
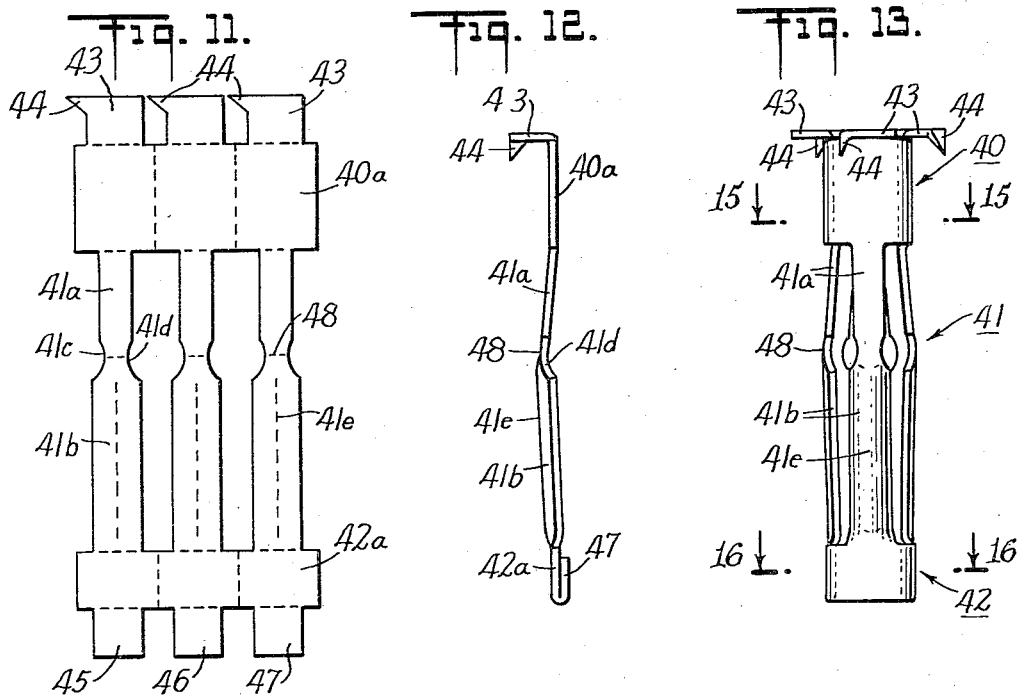
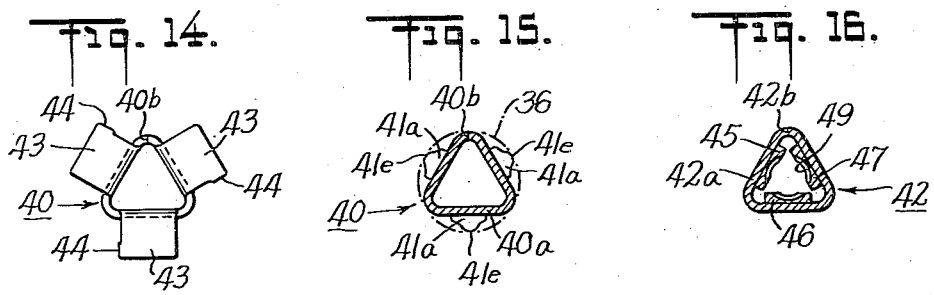
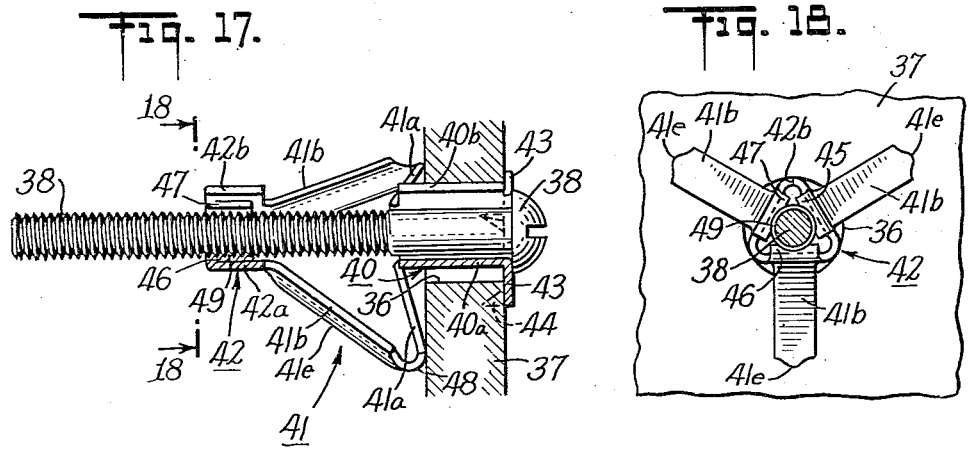

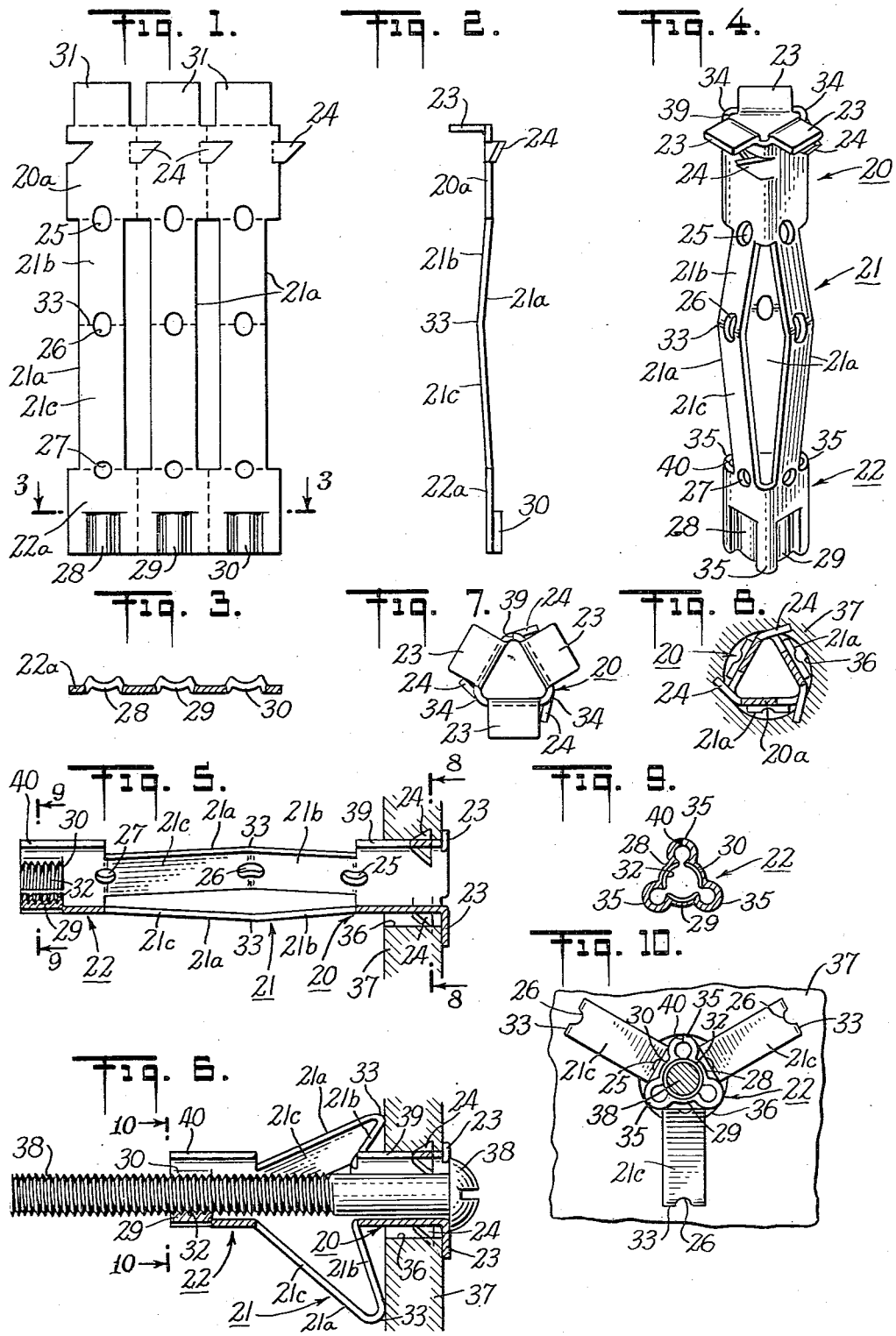

United States Patent Office 2,762,252
Patented Sept. 11, 1956

2,762,252

ONE-PIECE COLLAPSIBLE SHEET METAL BOLT ANCHOR

John Karitzky, Cranford, N. J., assignor to Diamond Expansion Bolt Company, Inc., Garwood, N. J., a corporation of New Jersey Application April 27, 1955, Serial No. 504,245

8 Claims. (Cl. 85—2.4)

This invention relates to improvements in bolt anchors, and more specifically to improvements in expansion anchors of the type adapted to fasten a fixture or the like to a wall or other support.

To the best of my present knowledge there are commercially available but two anchors of the type in question, these being of the nature of that shown in U. S. Patent No. 2,559,281 to G. F. Croessant. While these anchors have enjoyed commercial acceptance and are reasonably efficient in use, they, nevertheless, have certain shortcomings which my improved bolt anchor overcomes.

In the first place, these known anchors are both difficult and costly to manufacture because, not counting the bolt, they comprise three parts, namely, a body and two disc-like end pieces, one of which is threaded to receive the bolt, and the other of which forms the head of the anchor. It is necessary, for efficient use of the anchor, that these end pieces be not only secured to the anchor body (this is customarily done by welding) but also be coaxially aligned therewith so that the bolt will be readily received and can ultimately be taken up so as properly to collapse the anchor in tight fastening position.

As these anchors are mass production items, they are made by automatic machinery. When such machinery gets out of adjustment, as it not infrequently does, the end pieces are welded on out of alignment and/or the welds are weak, resulting in a substantial number of rejects or partially out-of-line or weak anchors. Rejects, of course, run up the cost, and imperfects result in dissatisfied customers.

In the second place, and because of the three-piece construction, part handling in the assembly of the anchor is highly complicated. After the body of the anchor is blanked out and formed into generally tubular shape, it, together with the two end pieces, must be hopper or otherwise fed into the assembling machine in such perfectly timed relation that the three parts can be secured together in proper alignment. Even with the best designed machine, this has proven to be a difficult and costly operation.

The two anchors referred to hereinabove are primarily tubular, comprising a bolt receiving sleeve to which one of the end piece discs is welded, and a spaced aligned nut supporting sleeve, the nut being the other end piece disc welded to the latter sleeve. These sleeves are integrally joined by four or more intermediate circularly spaced connecting strips or legs, the legs being outwardly bowed so that at approximately the middle of each there is an apex, the apices of the several legs lying in a circle whose diameter exceeds that of the tubular bolt receiving and nut supporting sleeves. It accordingly follows that the hole in the work that is to receive the anchor must have at least the diameter of the apices and must accordingly be larger than the two sleeves, resulting in a sloppy fit between the anchor and the work. It further follows that as a result of this sloppy fit, there is always the possibility if not the probability of the anchor canting to one side or another of its proper axis when the bolt is taken up to collapse the anchor. Not infrequently this canting of the anchor makes it difficult if not impossible to unscrew the bolt with the fingers prior to its reinstallation to fasten the fixture which the bolt is to ultimately support. While in most cases the bolt, when the anchor is so canted, can be removed and reinstalled with a screwdriver, such operation is time-consuming and a nuisance.

It occasionally is desirable for various reasons to remove the anchor, after it has been collapsed, from the hole in which it has been installed. With the anchors hereinabove referred to, such removal is practically impossible because the end piece on the bolt receiving sleeve is welded thereto, and after the anchor has been installed there is no way to detach such end piece from its sleeve, which is the only way the anchor could be released.

It is accordingly among the objects of my invention to provide a bolt anchor which effectively overcomes the foregoing shortcomings as well as others in a thoroughly practical and efficient manner. Other objects will be in part apparent and in part pointed out hereinafter.

The invention accordingly consists in the features of construction, combinations of elements, and arrangements of parts, all as will be illustratively described herein, and the scope of the application of which will be indicated in the following claims.

In the drawing, wherein I have shown two forms of my invention,

Figure 1 is a plan view of the bolt anchor as it appears after several stages of the stamping operation;

Figure 2 is a side view of the blank shown in Figure 1, but with the top flange bent to its final position;

Figure 3 is a section taken along the line 3—3 of Figure 1;

Figure 4 is a perspective view of the finished bolt anchor;

Figure 5 is a sectional view showing the bolt anchor installed in a wall or the like, but without the bolt, and prior to being collapsed;

Figure 6 is a sectional view somewhat similar to Figure 5, but showing the anchor collapsed in fastened position and the bolt extending therethrough;

Figure 7 is a top plan view of the anchor shown in Figure 4;

Figure 8 is a section taken along the line 8—8 of Figure 5;

Figure 9 is a section taken along the line 9—9 of Figure 5;

Figure 10 is a section taken along the line 10—10 of Figure 6;

Figure 11 is a plan view of a modified form of bolt anchor as it appears after the first stages of the stamping operation;

Figure 12 is a side view of the blank shown in Figure 11 after the blank has been further formed;

Figure 13 is an elevation of the bolt anchor completely formed from the blank shown in Figures 11 and 12;

Figure 14 is a top plan view of the anchor shown in Figure 13;

Figure 15 is a sectional view taken along the line 15—15 of Figure 13;

Figure 16 is a section taken along the line 16—16 of Figure 13;

Figure 17 is a sectional view showing the anchor of Figure 13 in its collapsed condition, and with the bolt extending therethrough; and Figure 18 is a sectional view taken along the line 18—18 of Figure 17.

Similar reference characters refer to similar parts throughout the views of the drawing.

As will be described in detail hereinafter, my bolt anchor is fabricated from an integral blank stamped from a strip of suitable sheet metal. In general, it comprises a bolt receiving sleeve of triangular cross-section and from the outer edges of which extend supporting flanges which rest against the outer surface of the wall to which the anchor is to be secured. Extending integrally from the inner edges of the sleeve are three legs which respectively lie generally in the planes of the three sides of the sleeve. The other ends of these legs are integral with the nut of the anchor which is also of triangular cross-section and whose extremity is indented on each side to provide stock which may be threaded for the reception of a bolt. Adjacent the sleeve end flanges referred to above, I preferably provide outstanding lugs which project from the sleeve at the apices thereof, these lugs being provided to prevent rotation of the anchor after it has been installed and during the collapsing thereof, while the bolt is being threaded into it. Preferably the aforementioned legs are slightly pre-bent so that each has an apex which lies outside of a plane common to the sleeve and nut sides with which it is integral. This pre-bend of the three legs, however, is such that the apices thereof lie within a circle whose diameter is the same as that of the circle within which the apices of the sleeve and nut lie. Accordingly it follows that the hole in the wall in which the anchor is to be installed is of the same diameter as that of all of the aforementioned apices, and hence when the anchor is installed in the wall it fits snugly therein and accordingly is well supported during the collapsing operation, thus precluding any canting of the anchor during its collapse. Thus the sleeve, nut and bolt, after the anchor has been collapsed, are coaxial, rendering it an easy finger operation to unscrew the bolt for the application of such fixture to the wall as is to be supported by the bolt when it is rethreaded into the anchor.

Referring now to the drawing, and particularly to Figure 4 thereof, it may be seen that my anchor comprises a sleeve, generally indicated at 20, from which extend legs, generally indicated at 21, whose upper ends, as viewed in Figure 4, are integral with the sides of sleeve 20. The lower ends of these legs are integral with a nut, generally indicated at 22. The upper end of sleeve 20 has integrally formed flanges 23 which extend at right angles from the sides of sleeve 20, these flanges being provided to limit the insertion of the anchor through a hole, as will appear more clearly hereinafter. As may be seen from Figure 7, sleeve 20 is triangular in cross-section, and at each of the apices of the sleeve (Figure 4) I preferably provide an outstanding lug, such as lug 24, which is driven into the wall or the like when the anchor is inserted therein so as to preclude rotation of the anchor when the bolt is threaded therethrough to collapse the anchor.

As may be seen from Figure 4, the entire anchor is formed of an integral piece of suitable sheet metal which, after preliminary stamping operations, takes the form of the blank shown in Figure 1. In this form the blank is flat except for the lugs 24 which extend outwardly of the plane of the blank. The blank thus includes a sleeve section 20a from which sleeve 20 (Figure 4) is formed. The blank also includes leg sections 21a (Figure 1) from which legs 21 (Figure 4) are ultimately formed, these leg sections 21a each being provided with preferably ovate holes 25, 26 and circular holes 27, these holes providing weakened points to facilitate the collapsing of the anchor upon installation thereof. At the lower ends of the leg sections 21a, as viewed in Figure 1, is a nut section 22a, which nut section is arcuately indented as at 28, 29 and 30 (see also Figures 2 and 3) to provide stock within the nut 22, after the blank shown in Figure 1 has been bent into the triangular shape of the finished anchor shown in Figure 4. These indents accordingly lie within the nut 22 (Figures 4 and 9) and provide stock therewithin which may be tapped to furnish threads 32 for the ultimate reception of the bolt which is to be anchored. At the upper end of the blank shown in Figure 1 are tabs 31 which are bent at right angles to the plane of the blank to form the end flanges 23 of the anchor (see also Figures 2 and 4).

After the tabs 31 of the blank have been bent to form flanges 23, the blank is further formed or it may be formed prior to bending of the tabs to provide a prebend to leg sections 21a (Figure 2) so that when the blank is finally bent to the Figure 4 form, each of legs 21 has an apex 33 between the upper and lower ends thereof. At this point it might be well to point out that sleeve 20 (Figure 7) is of triangular cross-section, as noted hereinabove, and accordingly includes apices 34, and also that nut 22 (Figure 9) includes apices 35, the sleeve and nut apices being in alignment and accordingly defining the triangulated plane surfaces of the sleeve and nut, these apices furthermore lying within the circumference of circles of identical diameter. The prebending of legs 21 (Figures 4 and 8) results in the apices 33, as best shown in Figure 8, which also are encompassed by a circle whose diameter is the same as that of those hereinbefore referred to. After the blank of Figure 1 has been bent to form the anchor of Figure 4, the abutting edges of the blank form a seam 39 on the sleeve (Figure 7) and a seam 40 on the nut (Figure 9), and preferably both of these seams are brazed to preclude separation.

It may now be seen that the anchor of Figure 4 may readily be inserted through a hole whose diameter is the same as that of the circles encompassing the apices of sleeve 20, legs 21 and nut 22. Hence, upon initial installation of the anchor, and prior to its collapse, the anchor is held snugly within the hole through which it is inserted, the walls of this hole accordingly offering accurate and substantial support during the collapsing operation which substantially precludes canting of the anchor during its collapse. Thus, when the anchor is collapsed to its fastened position, the sleeve and nut are axially aligned, making possible easy finger manipulation of the bolt during unthreading and subsequent rethreading to attach the fixture (not shown) to be anchored.

When the blank shown in Figure 1 is bent to the finished, generally triangular form shown in Figure 4, nut 22 assumes the configuration shown in Figure 9, wherein it will be seen that indents 28, 29 and 30 form a substantially complete circular wall of stock concentric with the circle, encompassing the nut apices 35. These indents accordingly provide ample stock in which screw threads 32 may be accurately tapped. This Figure 9 configuration accordingly provides a nut of extreme rigidity and of assured coaxiality with sleeve 20, resulting in an anchor wherein all parts are assured of substantially perfect alignment.

Referring back to Figures 1, 2 and 4, it will be seen that legs 21 are flat. It is possible to use flat sections such as this with or without the weakened points provided by holes 25, 26 and 27, as the points of juncture of the legs with sleeve 20 and nut 22 are also planar, which renders relatively easy the bending, if necessary, at these points when the anchor is collapsed. However, and as will be pointed out hereinafter, either or both sections of each leg 21, i. e. the portions thereof lying on opposite sides of the apices 33 may be crowned (see Figure 12, for example) in V-shaped form, with the point of the V extending outwardly to materially stiffen the leg where so crowned. I have found this formation desirable under certain circumstances, but in others it is not necessary.

When the anchor is initially installed, as shown in Figure 5, it is inserted through a hole 36 in a wallboard or the like 37, and driven into place until lugs 24 are embedded in wall 37 and flanges 23 rest against the surface thereof to preclude further insertion of the anchor. In view of the fact that the effective diameter of sleeve 20 of the anchor is substantially the same as that of hole 36, the sleeve is snugly held in the hole by reason of the fit therebetween and by reason of the embedment in the wall of lugs 24. Hence the anchor is rather firmly held in proper position for subsequent introduction of the bolt. Thus, as shown in Figure 6, with the anchor installed as just hereinbefore described, a bolt 38 may be inserted through sleeve 20, threaded through nut 22 and then taken up so as to draw nut 22 toward sleeve 20, causing legs 21 to collapse. By virtue of the pre-bend imparted to the legs and assisted by the weakened points provided by holes 25, 26 and 27, the legs bend at holes 25 and apices 33, and to a lesser extent at holes 27, thus collapsing the legs to the point where apices 33 rest against the inner surface of wall 37, thus putting leg portions 21b under tension and leg portions 21c under compression. When this condition is arrived at during taking up on the bolt, a very material resistance to further turning of the bolt is readily felt so that the mechanic installing the device immediately realizes that the anchor is in proper and indeed at its strongest securing position, and accordingly desists from further taking up of the bolt. Indeed, I have found that it is practically impossible further to collapse the anchor because, among other reasons, leg sections 21c are longer than leg sections 21b and, being under compression, exert extreme resistance to bending, which would permit further collapse of the anchor and subsequent misalignment of the nut 22 with respect to sleeve 20. Furthermore, because of the nature of the threading of nut 22, i. e. the substantial amount of stock provided by indents 28, 29 and 30, and the axial length thereof, a substantial number of threads are provided so that there is little or no danger of these threads being stripped during the collapsing of the anchor. Thus, with the anchor so collapsed to its securing position, it is but a simple matter to reverse the direction of rotation of bolt 38 slightly with a screwdriver, and thereafter spin it out by the fingers, after which it may be as easily rethreaded into the anchor for the attachment of whatever fixture is to be supported.

Occasionally it is desired to remove the anchor subsequent to its collapse. Through the provision of bent-over supporting flaps 23 this is readily accomplished simply by withdrawing the bolt 38, bending the flaps 23 until they are aligned with the respective sides of nut 20, and then pushing the anchor through the hole. Thus the same hole can be reused, precluding the necessity of drilling another hole in wall 37 which, under certain circumstances, may be impossible.

In Figures 11 through 18 of the drawing, I have shown a modified form of my bolt anchor, this modification being in general similar to that shown in Figures 1 through 10, but differing in certain important details. Thus, as viewed in Figure 13, the finished anchor includes a sleeve, generally indicated at 40, legs, generally indicated at 41, a nut, generally indicated at 42, and supporting flanges, generally indicated at 43. This anchor is formed from the stamped blank shown in Figure 11, which blank includes a sleeve section 40a, legs 41 and a nut section 42a. Extending upwardly, as viewed in Figure 11, from sleeve section 40a, are flanges 43, which are so formed as to include lugs or teeth 44; extending downwardly from nut section 42a are tabs 45, 46 and 47. Each of legs 41 includes an upper section 41a and a lower section 41b, the latter leg section preferably being longer than section 41a, the two sections being defined by cut-outs 41c and 41d, these cut-outs providing a weakened point. It should also be noted that preferably leg section 41a is narrower than leg section 41b, and also that the point of juncture between the upper end of leg section 41a and sleeve section 40a is planar or flat, the same being true of the juncture of the lower end of leg section 41b with nut section 42a.

After the blank shown in Figure 11 has been formed, flanges 43 are bent at right angles, as shown in Figure 12, to sleeve section 40a, and the lugs or teeth 44 are bent at right angles to their respective flanges. Also, a prebend may then be imparted to legs 41 so as to impart to each leg an apex 48 intermediate the cut-outs 41c and 41d, this pre-bend thus causing the planes of leg sections 41a and 41b to diverge from the common plane of sleeve and nut sections 40a and 42a. As may be seen from Figure 12, each of leg sections 41b is so formed as to be generally of a V section, with the point 41e of the V pointing outwardly of the leg section (see Figure 15) to provide added resistance to compressional stresses. Referring back to Figure 12, it may be seen that each of tabs 45, 46 and 47, shown in Figure 11, are bent 180° (tab 47, Figure 12, for example) against nut section 42a, so that these tabs provide stock in which threads may be tapped to complete the nut 42. After these aforementioned forming and bending operations have been completed, the blank shown in Figure 12 is finally formed to the shape of the anchor shown in Figure 13, which, as in the case of the anchor shown in Figure 4, is of generally triangular cross-section, and the seams 40b and 42b are brazed. Thus, the apices of sleeve 40, legs 41 and nut 42 all lie within circles of identical diameter (see Figures 15 and 16).

The manner in which tabs 45, 46, and 47 provide stock to be threaded for nut 42 is best shown in Figure 16, wherein it may be seen that these tabs are threaded as at 49, providing adequate threads both radially and axially (see also Figure 17) for the reception of the bolt 38. The anchor shown in Figure 13 is installed in exactly the same manner as described in connection with Figures 5 and 6, so that upon ultimate collapse the modified form of anchor assumes the position shown in Figure 17, with the shorter legs under tension and the longer ones under compression, but with all parts coaxially aligned and sturdily secured in proper assembled relation to wall 37. As in the case of my preferred anchor, the one shown in Figure 17 can readily be removed by bending back the flanges 43 and pushing the anchor back through hole 36.

It accordingly may be seen that I have provided an improved bolt anchor which attains the several objects set forth hereinabove in a thoroughly practical and efficient manner.

As many possible embodiments may be made of the mechanical features of the above invention, and as many changes might be made in the embodiment above set forth, all without departing from the scope of the invention, it is to be understood that all matter hereinbefore set forth, or shown in the accompanying drawings, is to be interpreted as illustrative and not in a limiting sense.

I claim:

1. A bolt anchor comprising, in combination, an anchor body including a bolt sleeve for supporting the head end of a bolt and a threaded nut portion for threadably receiving the threaded end of the bolt, said sleeve having an axial length at least as great as the diameter of the bolt, said sleeve and nut portion being triangular in cross section, a plurality of legs interconnecting said sleeve and nut portion, said legs, sleeve and nut portions being one piece, each of said legs having a short section extending from said sleeve and a long section extending from said nut, each of said leg sections being straight but said short section being flat transversely and tangential to the axis of the anchor and accordingly readily bendable at any point between its extremities while said long section is also straight but is bowed transversely so as to be rigid when in substantial compression, said sleeve having uninterrupted inner and outer peripheries and said nut portion being an integral element having internal threads therein extending axially of said nut portion a distance at least as great as the diameter of the bolt.

2. A bolt anchor in accordance with claim 1 wherein each of said legs is substantially coplanar with the walls of the sleeve and nut portion to which it is connected.

3. A bolt anchor in accordance with claim 1 wherein each of said legs is slightly bowed intermediate its ends so that each leg has an apex, the leg apices defining a circle whose diameter is the same as that of those defining by the apices of said sleeve and nut portion.

4. A bolt anchor in accordance with claim 1 wherein each of said legs is substantially coplanar with the walls of the sleeve and nut portion to which it is connected, and said sleeve has an integral lug extending from the outer end of each of its walls, said sleeve, nut portion, legs and lugs being formed from a single stamping.

5. A bolt anchor in accordance with claim 1 wherein the inner walls of said sleeve are tangent to a circle whose diameter is substantially the same as the diameter of the bolt to be supported thereby.

6. A bolt anchor in accordance with claim 1 wherein each of said legs is substantially coplanar with the walls of the sleeve and nut portion to which it is connected, and said sleeve has an integral lug extending from the outer end of each of its walls, said sleeve, nut portion, legs and lugs being formed from a single stamping, each of said lugs being provided with an anti-turning tooth.

7. A bolt anchor in accordance with claim 1 wherein each of said legs is substantially coplanar with the walls of the sleeve and nut portion to which it is connected, and said sleeve has an integral lug extending from the outer end of each of its walls, said sleeve, nut portion, legs and lugs being formed from a single stamping, the abutting edges of said sleeve and nut portion being welded.

8. A bolt anchor comprising, in combination, an anchor body including a bolt sleeve for supporting the head end of a bolt and a threaded nut portion for threadably receiving the threaded end of the bolt, said sleeve having an axial length at least as great as the diameter of the bolt, said sleeve and nut portion being triangular in cross section, a plurality of legs interconnecting said sleeve and nut portion, said legs, sleeve and nut portions being one piece, each of said legs having a short section extending from said sleeve and a long section extending from said nut, each of said leg sections being straight but said short section being flat transversely and tangential to the axis of the anchor and accordingly readily bendable at any point between its extremities while said long section is also straight but is bowed transversely so as to be rigid when in substantial compression, said sleeve having uninterrupted inner and outer peripheries and said nut portion being an integral element having internal threads therein of substantial axial extent at least greater than the thickness of the metal from which the anchor is formed.

References Cited in the file of this patent

UNITED STATES PATENTS

| | | |
|---|---|---|
| 1,084,458 | Malaby | Jan. 13, 1914 |
| 1,111,660 | Malaby | Sept. 22, 1914 |
| 2,017,421 | Post | Oct. 15, 1935 |
| 2,018,251 | Croessant | Oct. 22, 1935 |
| 2,090,640 | Rosenberg | Aug. 24, 1937 |
| 2,320,785 | Luce | June 1, 1943 |
| 2,396,501 | Gibson | Mar. 12, 1946 |
| 2,538,601 | Taylor | Jan. 16, 1951 |
| 2,559,281 | Croessant | July 3, 1951 |

FOREIGN PATENTS

| | | |
|---|---|---|
| 152,854 | Great Britain | Oct. 28, 1920 |
| 608,218 | Great Britain | Sept. 13, 1948 |
| 832,221 | Germany | Feb. 21, 1952 |